(12) United States Patent
Bregman-Amitai et al.

(10) Patent No.: US 8,116,685 B2
(45) Date of Patent: Feb. 14, 2012

(54) SYSTEM AND METHOD FOR VISUAL PAIRING OF MOBILE DEVICES

(75) Inventors: Orna Bregman-Amitai, Tel-Aviv (IL); Noam Sorek, Zikhron-Yaakov (IL); Eduard Oks, Bat-Yam (IL); Eyal Toledano, Kiryat Ata (IL)

(73) Assignee: Samsung Electronics Co., Inc., Gyeonggi-do (KR)

( * ) Notice: Subject to any disclaimer, the term of this patent is extended or adjusted under 35 U.S.C. 154(b) by 261 days.

(21) Appl. No.: 12/693,577

(22) Filed: Jan. 26, 2010

(65) Prior Publication Data
US 2011/0183612 A1 Jul. 28, 2011

(51) Int. Cl.
*H04B 7/00* (2006.01)
(52) U.S. Cl. ... 455/41.2; 455/3.06; 455/410; 455/414.1; 348/222.1; 713/183
(58) Field of Classification Search ............. 455/41.2, 455/3.06, 414.1, 414.4, 41.1, 410, 556.1, 455/566, 344; 348/222.1, 333.05, 394.1; 382/115; 713/183, 182, 150
See application file for complete search history.

(56) References Cited

U.S. PATENT DOCUMENTS

| | | | | |
|---|---|---|---|---|
| 3,987,725 | A * | 10/1976 | Scantlin | 101/128.4 |
| 4,924,078 | A * | 5/1990 | Sant'Anselmo et al. | 235/494 |
| D364,447 | S | 11/1995 | Wang | |
| 5,612,524 | A * | 3/1997 | Sant'Anselmo et al. | 235/494 |
| 6,526,158 | B1 * | 2/2003 | Goldberg | 382/115 |
| 6,580,448 | B1 * | 6/2003 | Stuttler | 348/46 |
| 6,783,069 | B1 * | 8/2004 | Hecht et al. | 235/454 |
| 7,042,355 | B2 * | 5/2006 | Hunter et al. | 340/541 |
| 7,280,101 | B2 * | 10/2007 | Miyamoto | 345/169 |
| 7,306,341 | B2 * | 12/2007 | Chang | 353/94 |
| 7,367,809 | B2 * | 5/2008 | Takahashi | 434/262 |
| 7,602,420 | B2 * | 10/2009 | Watanae | 348/211.2 |
| 7,909,255 | B2 * | 3/2011 | Young | 235/462.13 |

(Continued)

FOREIGN PATENT DOCUMENTS

KR 2008-0022327 3/2008

OTHER PUBLICATIONS

"Secure Device Pairing based on a Visual Channel"; Saxena et al, (Proceedings of the 2006 IEEE Symposium on Security and Privacy).

*Primary Examiner* — Minh D Dao
(74) *Attorney, Agent, or Firm* — Roach Brown McCarthy & Gruber, P.C.; Kevin D. McCarthy

(57) ABSTRACT

System and method for visual pairing between wireless devices, according to which a first software component is installed on a first WCD with a display screen and a second software component is installed on a second WCD having a camera and then a request to establish an open WCC is sent from the second WCD to the first WCD. If the request is approved by the first WCD, an image with graphically encoded unique one-time information is generated on the display screen using the first software. The image is captured by the camera and the information is decoded in the captured image by using the second software component. This information is used to establish an open WCC between the second WCD and the first WCD.

14 Claims, 2 Drawing Sheets acquired image

Red component

Green component

Blue component

U.S. PATENT DOCUMENTS

| | | |
|---|---|---|
| 8,024,576 B2* | 9/2011 | Gargaro et al. ............... 713/183 |
| 2003/0043974 A1* | 3/2003 | Emerson, III ............. 379/88.13 |
| 2005/0168569 A1* | 8/2005 | Igarashi et al. ................. 348/62 |
| 2006/0028557 A1* | 2/2006 | Watanabe ................ 348/211.99 |
| 2006/0135064 A1 | 6/2006 | Cho et al. |
| 2007/0070429 A1* | 3/2007 | Hein et al. ................... 358/3.28 |
| 2008/0097547 A1* | 4/2008 | Vyas et al. ...................... 607/54 |
| 2009/0027241 A1* | 1/2009 | Lin et al. ......................... 341/94 |
| 2009/0158039 A1 | 6/2009 | Prasad |
| 2010/0201812 A1* | 8/2010 | McGibney et al. ........... 348/143 |

* cited by examiner image of code 128,123,76,1,55,64

Red component

Green component

Blue component acquired image

Red component

Green component

Blue component

SYSTEM AND METHOD FOR VISUAL PAIRING OF MOBILE DEVICES

FIELD OF THE INVENTION

The present invention belongs to the field of wireless communications. More particularly, the invention relates to a method for transferring data by the establishment of ad-hoc communication visual channels between wireless communication devices.

BACKGROUND OF THE INVENTION

It is well known that in the field of wireless communications, that the establishment of user friendly, quick and safe communication channels between wireless communication devices is often highly desirable. For example, enabling common users of mobile phones a user friendly, safe and Ad-hoc communication and data transfer with other devices.

Today, most end users do not establish Wi-Fi, Bluetooth and other types of wireless connections with other devices because the required procedure for doing so is too complicated. Hence, these end users do not explore the benefit of transferring/sharing data with other devices.

The use of Wi-Fi is highly advantageous to the use of Bluetooth because it enables significantly higher data transfer rates, which makes the Wi-Fi wireless connection into a viable and leading alternative amongst the other methods of wireless data transfer, especially between small and mobile personal wireless devices. Whereas, the Bluetooth protocol is not adapted to support the transfer of large data files (i.e. high-resolution pictures, videos, large applications, music and the like) with reasonable for the end users.

In common mobile phone devices, establishing the wireless network connection such as Bluetooth requires at least 5-6 steps to be taken by the user. In many cases, the procedure fails and the user has to repeat all steps. Moreover, correct configuration for Wi-Fi is very difficult and requires additional skills that normal phone users typically do not have (such as setting IP configurations protocol and service discovery).

Nokia currently uses common "shaking" to establish a Bluetooth connection between wireless devices. However, it does not support WiFi protocol.

Patent application No. KR 2008-0022327 to LG and patent applications No. KR2004-0093726 and US2006/0135064 to Samsung, relate to the option of acquiring the connectivity properties through the reading of a printed barcode, using a camera module. However, these applications are directed to connect a mobile phone to other devices that do not necessarily have screens (like a wireless printer or an earpiece).

"Secure Device Pairing based on a Visual Channel" to Saxena et al, (Proceedings of the 2006 IEEE Symposium on Security and Privacy) describes an authentication method which is based on a two dimensional barcode and camera, basically done for security purposes. However, it is limited to Bluetooth channels do not support WiFi. However, the size of code that could be visually transferred was limited due to resolution problems and therefore, only a part of the data regarding various communication channels has been transferred.

U.S. Patent Application No. 20090158039 describes an authentication method using human bit string (e.g. audible beeps and blinking).

"Device pairing using "human-comparable" synchronized audible and/or visual patterns" and U.S. Patent Application No. 29031258A1 describe gesture activated close proximity activity.

Amongst the drawbacks of these prior art solutions, is that they are not intuitive, and require the user to understand the procedure. Also, the solutions mentioned in KR 2008-0022327 and KR2004-0093726 do not suggest generating an image (i.e., a marker), on-line, in the devices. They do not suggest dynamic codes that might change from operation to operation. They further do not suggest Wi-Fi channels, but are limited to Bluetooth.

It is therefore an object of the present invention to provide a system and method for the establishment of communication channels between wireless communication devices, and which overcome the problems associated with the prior art.

It is an object of the present invention to enable a system and method for the establishment of communication channels between wireless communication devices, in a user friendly, quick and safe manner.

It is another object of the present invention to enable a system and method for the establishment of communication channels between wireless communication devices, wherein the connection may be easily and automatically disconnected after the communication ceases.

It is still another object of the present invention to enable a system and method for the establishment of communication channels between wireless communication devices, wherein the connection may be impersonal, without disclosing personal and contact details of the user and his wireless communication device.

It is yet another object of the present invention to enable a system and method for the establishment of communication channels between wireless communication devices, wherein the communication channels may be adapted for high rate and efficient data transfer.

Other objects and advantages of the invention will become apparent as the description proceeds.

SUMMARY OF THE INVENTION

The present invention is directed to a system and method for visual pairing.

The system for visual pairing comprises:
  a. a first and a second WCD (wireless communication device) with means for establishing a common WCC (Wireless Communication Channel) between them;
  b. said first WCD having a display screen and first software; and
  c. said WCD having a camera and second software;
wherein when said first WCD receives a request from said second WCD to establish an open WCC between said first WCD and said second WCD, and when the request is approved by a user or a controller of said first WCD:
  said first software is adapted to produce an image with graphically encoded information on said display screen of said first WCD, wherein said image is dynamic; and
  said second software is adapted to:
  decode said information from said image as it is inputted to said second WCD through said camera; and
  use said information to enable said second WCD to establish an open WCC with said first WCD.

In some embodiments, the open WCC can be established between three or more WCDs.

In some embodiments, said request may be sent in response to a prior request for an open WCC that is sent from the first WCD to the second WCD.

In some embodiments, the first device may also have a camera and said second software.

In some embodiments, the second device may also have a display screen and said first software.

The WCC may be adapted to use at least one of the following wireless networks: Wi-Fi, Bluetooth, and networks using other IEEE 802 wireless communication protocols.

In some embodiments, the request may contain a part of the information that is graphically encoded in the image by said first software.

In some embodiments, the part of the information further includes an additional part of information that was received by the second WCD from at least one third WCD, and the open WCC is established between the: first WCD, second WCD, and said at least one third WCD.

In some embodiments, the open WCC may be closed by a user or a controller of any of the WCDs between that user's or controller's WCD and the other WCDs connected to it via the open WCC.

In some embodiments, the user or controller may choose to close an open WCC between his WCD and any other specific WCD out of a plurality of WCDs connected to his WCD through the WCC.

In some embodiments, the open WCC between one WCD and another WCD is closed automatically based on a timer which counts a preset amount of time during which the open WCC is not active.

In some embodiments, the open WCC between one WCD and another WCD is closed automatically based on a timer which counts a preset amount of time during which there is no wireless communication at all between the WCDs.

The method for visual pairing comprises the following steps:
 a. initially installing a first software on a first WCD having a display screen;
 b. initially installing a second software on a second WCD having a camera;
 c. sending a request to establish an open WCC from said second WCD to said first WCD;
 d. if the request is approved by a user or a controller of the first WCD, producing an image with graphically encoded information on said display of said first WCD by means of said first software;
 e. capturing the image by means of said camera;
 f. decoding the information in said image by means of said second software; and
 g. using the information to establish an open WCC between said second WCD and said first WCD.

In some embodiments, the method further includes establishing an open WCC between three or more WCDs.

In some embodiments, the request to establish an open WCC from the second WCD to the first WCD, is made in response to a prior request for an open WCC that was sent from the first WCD to the second WCD.

The method may further include the first WCD and second WCD communicating through a WCC that uses at least one of the following wireless networks: Wi-Fi, Bluetooth, and networks using other IEEE 802 wireless communication protocols.

In some embodiments, a part of the information that is graphically encoded in the image by said first software is included in the request.

In some further embodiments, the part of the information is further made to include an additional part of information that was received by the second WCD from at least one third WCD, and the open WCC is established between the: first WCD, second WCD, and said at least one third WCD.

In some embodiments, the method further comprises closing the open WCC between a WCD and at least one other WCD in response to at least one of:
 a user's or a controller's command;
 lack of activity of the open WCC for a certain time period; and
 lack of any wireless communication with the at least one other WCD.

The coded visual information that is necessary for establishing the open WCC may be encrypted by a key that is known only to a specific user or to a limited group of users, which is then used for decoding the information from the captured image.

BRIEF DESCRIPTION OF THE DRAWINGS

The above and other characteristics and advantages of the invention will be better understood through the following illustrative and non-limitative detailed description of embodiments thereof, with reference to the appended drawings, wherein.

DETAILED DESCRIPTION OF PREFERRED EMBODIMENTS

Figure 1:
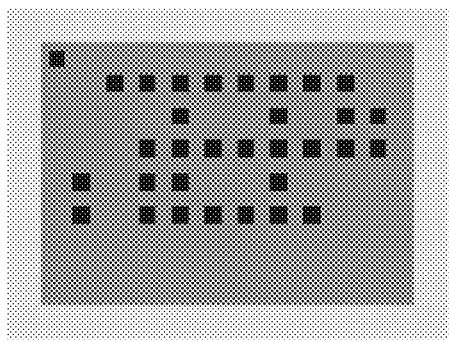
FIG. 1 shows an example of info coding (not QRCodes)
Figure 1:
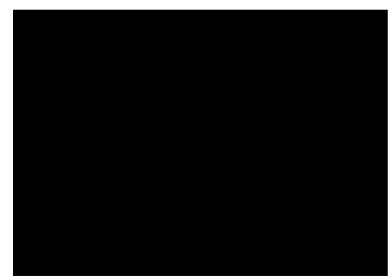
Figure 1:
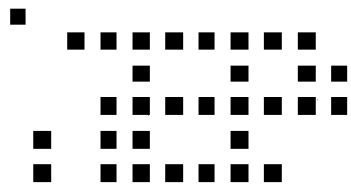
Figure 1:
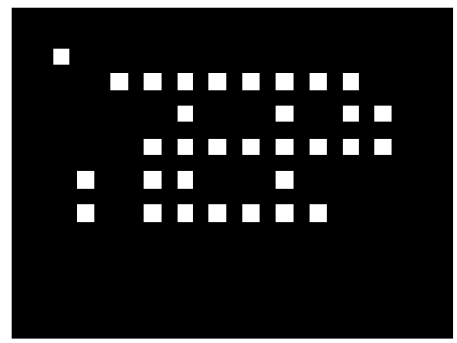

The present invention proposes a system and method for visual pairing between wireless communication devices. The system typically includes two WCDs (Wireless Communication Devices) with dedicated software that can establish an open WCC between each other. The open WCC is established after a dynamic image (i.e., a marker) is captured by a camera that belongs to the other WCD. This image, which is displayed on the screen of one of the WCDs, is created after its user (or a controller) has approved the establishment of this open WCC. The image is graphically encoded by dedicated software in the WCD, with the information that is necessary for establishing the open WCC. The image is then displayed on the display screen of the WCD. The other WCD can then capture the image by using its inherent camera. Similar dedicated software in the other WCD is used to decode the image that was captured by its camera, so as to extract the information that is necessary for establishing the open WCC. The information is then used to establish the open WCC.

It should be understood that the present invention, as it applies to any two WCDs that are capable of having an open WCC between them, only necessitates that one of them has a display screen and the other WCD has a camera. However, any additional features that are unnecessary according to the present invention, such as for example both a display screen and a camera in each WCD, do not limit the invention. A single WCD having both a display screen and a camera may or may not have either first or second software, and accordingly be able to implement the method proposed by the present invention according to both the hardware and the software that are available in that WCD.

An initial request for an open WCC that is sent from one WCD to the other is independent of the existence of a display screen or a camera in the WCD that sends the initial request. Whenever a visual pairing is desired, the WCD with a display screen that is used to display the image with graphically encoded information, receives an appropriate request to do so at some initial stage, from another WCD with a camera, even if this request is in response to a prior initial request from the WCD with a display screen. Also, the approval for the establishment of an open WCC by a user or a controller of the WCD with a display screen can be made at any stage during the exchange of these requests. Similar approval of the user or a controller of the WCD with a camera can be made at any stage, including after its camera has captured the image with graphically encoded information.

The present invention can allow the establishment of an open WCC over a plurality of wireless networks. These wireless networks may include, but are not limited to: Wi-Fi, Bluetooth, and networks using other IEEE 802 wireless communication protocols. It should be noted that the use of Wi-Fi according to the present invention is especially advantageous, as it enables communication with relatively high data transfer rates that can be efficiently use to exchange large amounts of data between a pair of WCD (for example, high resolution pictures, music files, large applications, movies and videos).

The term WCD (Wireless Communication Device) may refer to any of a plurality of known devices and capable of and equipped with means for wireless communication. For example: a mobile phone, a PDA, a computer, an earphone and the like. The term is also not limited to a single physical device, i.e., it may also refer to a system comprising of several interconnected apparatuses, such as for example a screen coupled to a server which is in turn coupled to a wireless transceiver.

The term open WCC should be understood in the context of an open connection that is authorized, and by means of which extensive data volumes and general user selected content may be shared and exchanged between the WCDs. This is in contrast to the basic wireless features generally available by default between WCDs, for example for the purpose of mutual detection and identification. Thus, these terms and their general meaning as it applies to the present invention should be apparent to those skilled in the art.

The term dynamic image should be understood in the context of an image that is generated specifically for each visual pairing procedure and at least in part includes random components. This means that the image is unique for each pairing session, barring similarities that might occur but are very unlikely due to the generally limited range of possible coded images that can be displayed by the hardware of the display screen. The image is a two-dimensional general info code or a bar-code (e.g. QR-Code) and it contains information that is relevant for the wireless communication.

The random components generally include at least a pairing one-time password that is later used for authorization prior to the establishment of an open WCC. The non-random components, if they exist, may simply define the standard format of the image. That is, since the full graphical capabilities of a typical display screen (i.e. resolution and color range), of a mobile phone for example, enable a far greater range of graphical images to be displayed than the typical required range of coded information. It allows generating a safe (i.e., sufficiently encoded) and easily acquirable image by a typical camera of another device in typical non perfect conditions. The image is coded by using a graphical encoding format with defined code rules, the end product of which is more limited than the range of full graphical capabilities of a display screen. However, the non-random components may also contain additional information, such as an IP and SSID for a Wi-Fi network.

In the second WCD which captures the image presented on the display of the first WCD, the second software (i.e. an image processing component) decodes the information and afterwards the open WCC is initiated (optionally, by one specific or either one of the WCDs) according to the information that contains the one-time password—provided that the user/controller of the second WCD has already approved the establishment of an open WCC. After the open WCC is established, the image may disappear or remain on the display or be saved into the memory of the first WCD.

According to the present invention, the request that is sent to the WCD having a display screen may optionally contain a part of the information that is graphically encoded in the image by the first software. For example, the WCD having a camera may send, as part of the request, a number to the WCD having a display screen and this number is added to the information that is graphically encoded and displayed as the image on the display, either in direct form or after some logical transformation of some or all of the information.

The present invention may also be used for the establishment of an open WCC between three or more WCDs. One way in which this is achieved is by performing a number of visual pairings between pairs of WCDs until each WCD has performed visual pairing with each other WCD amongst the three or more WCDs. Alternatively, optionally a first WCD that has performed visual pairing with a second WCD may approve the establishment of an open WCC with other WCDs that have an open WCC with the second WCD, after being informed of the other WCDs by the second WCD.

Another optional implementation of performing pairing of one WCD with a plurality of other WCDs can be achieved by performing visual pairing of a first WCD with a second WCD, wherein the first WCD receives an open WCC establishment request from the second WCD, and this request already contains information parts that were communicated to the second WCD by other WCDs. Following the approval of the request or parts of it by a user or a controller, the first WCD displays an image with graphically encoded information that includes information about the other WCD devices with which the establishment of an open WCC was approved by the user or controller. The image is then captured by the camera of the second WCD and consequently an open WCC is established between the first, second and other WCDs that were approved.

According to the present invention, the open WCC between at least two WCDs, once established, can be closed at any time on the side of any specific WCD if the user or controller of that WCD chooses to do so.

The open WCC may also be automatically closed in response to a lack of activity, i.e., no information is transferred between the WCDs through the open WCC between them, except for the optional automatic synchronization and/or status check signals as may be employed by some wireless communication protocols. In this case, a preset or a user/controller selected time period and a timer (that measures the continuous time periods during which the open WCC is inactive), are used to indicate when the connection should be closed. According to another option, the open WCC is automatically terminated if there is a lack of any wireless communication between the WCDs due to being out of range of each other. This option may be performed immediately when the WCDs recognize that they are out of range or also based on a set time period and a timer.

Optionally, the user/controller of a second WCD from which a first WCD has disconnected (closed the open WCC), may choose to keep the connection active, so that the user/controller of the first WCD may reestablish the open WCC.

Figure 2:
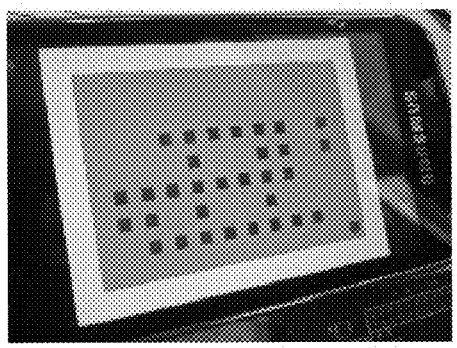
FIG. 2 shows an example of an image acquired (captured by a camera) by a wireless communication device.
Figure 2:
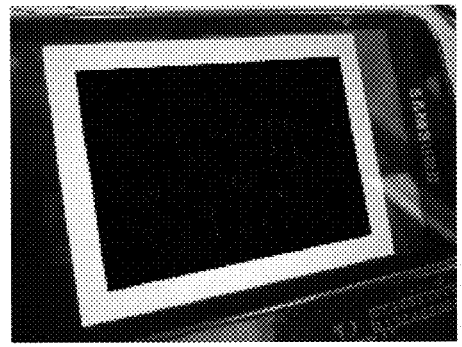
Figure 2:
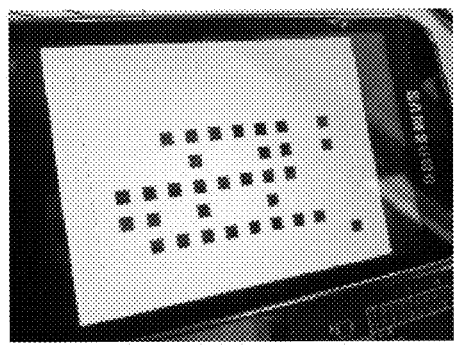
Figure 2:
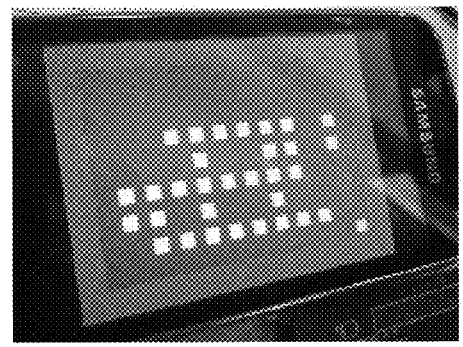

An example of info coding (not QRCodes) may be seen in FIG. 1. An example of an image acquired (captured by a camera) by a wireless communication device may be seen in FIG. 2.

Several known problems are associated with capturing of images by a camera of one WCD from a display screen of another WCD. The primary of these is that the code present on the display screen may be wrongly detected, thus resulting in a difference between the displayed image and the captured image. A major cause for this is the reflection of the display screen that damages part of the image captured by the camera. Optional solutions to this problem include, for example:

- Error correction by means of, for example, Reed-Solomon code and BCH code—(implemented in standard QRCode encoder/decoders).
- Decoding multiple frames of the image and requiring consensus in the end result.
- Using only two color components with opposite polarization for the image.

Some exemplary uses of the present invention are hereby described:

EXAMPLE 1

Image Transfer

A friend took picture of you with high-resolution. Sending via MMS or email requires reducing resolution and/or connecting to a server. Both cases cost money. Establishing an open WCC using Wi-Fi, Bluetooth or any other format enables transfer of the image without resolution reduction, free of charge.

EXAMPLE 2

A Marketing stand at the mall that uses visual pairing, can transfer commercial information to a user that wishes to get the information but does not wish to leave personal details such as an address, phone number, email and details about connection options to his wireless communication device. The users that wish to get the information read the image in order to join a network and receive the data. At the end of the communication, no trace of the customers remains and their privacy is saved. For this case it is to be noted, that the code must be changed frequently since the address (for example an IP) for accessing the wireless communication network is changed each time.

EXAMPLE 3

A public Snap&Go screen includes the "Visual Pairing" image on screen. Users that wish to use the Snap&Go connect to the server.

EXAMPLE 4

A Gaming or a Dating Session

A couple, who never met before, and may not wish to continue the communication, can establish "private" Ad-Hoc wireless communication. The communication can be used for gaming, romantic session or any other purpose. It may include a couple or enable others join the "private" network. The connection can be "broke" at any time by any of the members without leaving traces.

EXAMPLE 5

"Visual Pairing" as a Hand Shake

The intuitive establishment of connection by means of "Visual Pairing" can replace the hand shake since it can combine with file wring on both devices. It may include automatic memo or short meeting summary transfer.

Optionally, in order to increase the level of security, the coded visual information that is necessary for establishing the open WCC may be further encrypted by a key that is known only to a limited group of users or to a specific user. This key is then used for decoding this information from the image.

According to another embodiment, the open WCC established by the coded visual information may be used for enabling ad-hoc data transfer via an alternative cellular channel, for increasing the data transfer rate or for allowing transfer of a remaining portion of the data in case when from some reason the communication via the open WCC fails or intentionally terminated. Such scenario may be, for example, when two users meet and one of them wishes to transfer a large data file to the other user via the open WCC but one of them cannot wait until all data is transferred or when he wishes to increase the data transfer rate by using both channels. Another possible scenario is when at the beginning of data transfer the battery of one of the devices is low. In this case, the data transfer starts but cannot be completed. Therefore, the transfer of the remaining data may be carried out by using a tunneling process that allows transmission of data intended for use only within a private network, through a public network in such a way that the routing nodes in the public network are unaware that the transmission is part of a private network. Tunneling is generally done by encapsulating the private network data and protocol information within the public network transmission units so that the private network protocol information appears to the public network as data. The tunneling protocol makes it possible for authorized users to gain access to a virtual private network (VPN) through the cellular network using a tunneling ID.

In this case, both users will get a one-time tunneling ID for allowing an alternative data communication path between their devices only during the same session of the open WCC or as a result of this session. This one-time tunneling ID will be part of the coded image. When the open WCC (a session) is established as a result of reading the graphically encoded information, the data will start being transferred from one device to the other. When communication via the established open WCC stops before transferring the entire data, the tunneling process will be initiated for this session. Hence, the remaining portion to be transferred will be uploaded via the cellular network to a remote tunneling server using a secured VPN channel and then, will be streamed to the other device via a similar VPN channel. The tunneling server is a store and forward (a technique in which information is sent to an intermediate station where it is kept and sent at a later time to the final destination or to another intermediate station) system with memory that acts like a buffer for temporary storing the data to be transferred by the tunneling process via the cellular network.

This way, the recipient will remain connected to the same session whenever his device is identified by the cellular network and he will be able to receive the remaining portion via a VPN channel using the cellular network.

Similarly, several recipients may participate in the tunneling process by using the same tunneling ID, provided that all of them captured the coded image (that contains the tunneling ID). This is an advantage over using a BT or WiFi open WCC, which does not support data transfer to several recipients.

According to another embodiment, a data transfer session may include also cellular devices (recipients) which do not support any short-range communication such as BT or WiFi. In this case, the only thing required is capturing the coded image that contains the tunneling ID. Then, a tunneling process will be initiated for these cellular devices and the required data will be automatically transferred using the cellular network only.

Therefore, using the method proposed by the present invention, all the data required for the fast establishment of secure communication channels between devices is transferred and settings can be done in real-time.

The above examples and description have of course been provided only for the purpose of illustration, and are not intended to limit the invention. As will be appreciated by a person skilled in the art, the invention can be carried out in a great variety of ways in addition to those described above, all without exceeding the scope of the invention.

The invention claimed is:

1. A method for visual pairing between wireless devices of users, comprising:
   a. installing a first software component on a first WCD having a display screen;
   b. installing a second software component on a second WCD having a camera;
   c. sending a request to establish an open WCC from said second WCD to said first WCD;
   d. if the request is approved by said first WCD, generating an image with graphically encoded unique one-time information on said display screen using said first software;
   e. capturing said image by said camera;
   f. decoding said information in the captured image by using said second software component; and
   g. using said information to establish an open WCC for transferring data between said second WCD and said first WCD.

2. A method according to claim 1, further comprising establishing an open WCC between three or more WCDs.

3. A method according to claim 1, wherein the request to establish an open WCC from the second WCD to the first WCD is made in response to a prior request, sent from said first WCD to said second WCD.

4. A method according to claim 1, wherein the WCDs communicate through a WCC that uses one or more of the following wireless communication protocols:
   Wi-Fi;
   Bluetooth;
   IEEE 802.

5. A method according to claim 1, wherein a part of the information that is graphically encoded in the image is included in the request.

6. A method according to claim 1, wherein the information further includes an additional part that was received by the second WCD from a third WCD, and the open WCC is established between the first WCD, said second WCD, and said third WCD.

7. A method according to claim 1, wherein the open WCC between a WCD and at least one other WCD is closed in response to:
   a user's or a controller's command;
   lack of activity of the open WCC for a certain time period; or
   lack of any wireless communication with the at least one other WCD.

8. A method according to claim 1, further comprising:
   a) encrypting the coded visual information that is necessary for establishing the open WCC, by a key that is known only to a limited group of users or to a specific user; and
   b) using said key for decoding said information from the captured image.

9. A method according to claim 1, further comprising:
   a) including a tunneling ID in the coded unique one-time information;
   b) automatically initiating a tunneling process for the devices via the cellular network to which said devices are connected;
   c) transferring at least a portion of the data between devices via a VPN channel that is established by the tunneling process said cellular network.

10. A method according to claim 9, wherein at least a portion of the data is transferred between devices the VPN channel whenever communication via the open WCC fails or intentionally terminated.

11. A method according to claim 10, wherein whenever communication via the open WCC fails or intentionally terminated, the remaining portion to be transferred is uploaded via the cellular network to a remote server using a secured VPN channel and then streamed to the other device via a similar VPN channel.

12. A method according to claim 9, wherein several recipients that captured the coded image that contains the tunneling ID participate in the tunneling process.

13. A method according to claim 9, wherein a data transfer session resulting from the initiation of a tunneling process may include cellular devices which do not support any short-range communication capability.

14. A system for visual pairing between wireless devices users, comprising:
   a. a first WCD with means for establishing a common WCC with a second WCD, said first WCD having a display screen and a first software component; and
   b. a second WCD with means for establishing a common WCC with said second WCD, said second WCD having a camera and a second software component;
wherein when said first WCD receives a request from said second WCD to establish an open WCC between said first WCD and said second WCD, and when the request is approved by said first WCD, said first software component is adapted to produce a dynamic image with graphically encoded unique one-time information on said display screen, and said second software is adapted to decode said information from said image and to use said information to allow said second WCD to establish an open WCC with said first WCD for transferring data between said second WCD and said first WCD.

* * * * *